Sept. 1, 1964 M. EYQUEM 3,146,491
PRODUCTION OF HOLLOW ARTICLES IN THERMOPLASTIC MATERIAL
Filed July 24, 1961 2 Sheets-Sheet 1

INVENTOR.
MARCEL EYQUEM
BY Bauer and Seymour
ATTORNEYS

Sept. 1, 1964   M. EYQUEM   3,146,491
PRODUCTION OF HOLLOW ARTICLES IN THERMOPLASTIC MATERIAL
Filed July 24, 1961   2 Sheets-Sheet 2

INVENTOR.
MARCEL EYQUEM
BY Bauer and Seymour
ATTORNEYS

United States Patent Office 3,146,491
Patented Sept. 1, 1964

3,146,491
PRODUCTION OF HOLLOW ARTICLES IN
THERMOPLASTIC MATERIAL
Marcel Eyquem, Lagnieu, France, assignor to Compagnie de Saint-Gobain, Neuilly-sur-Seine (Seine), France
Filed July 24, 1961, Ser. No. 126,219
Claims priority, application France July 26, 1960
5 Claims. (Cl. 18—5)

The present invention relates to improvements in the automatic manufacturing of hollow objects of thermoplastic material, more particularly of hollow objects out of tubes of thermoplastic material.

It has already been proposed in French Patent No. 1,020,377, filed on May 24, 1950, to manufacture hollow objects such as containers (bottles, flasks, etc., starting with a tube of softened plastic material), by a process of placing the tube between two half-molds, closing the mold on the tube so that both ends of a segment of the tube are sealed, thus forming a tight enclosure into which, while the material is still soft, a fluid under pressure is injected, through a hollow needle, in such a way that the plastic material is forced against the internal walls of the cavity of the mold, after which the mold is opened so that the molded object can be extracted.

According to Patent No. 1,020,377, after the opening of the mold the appendage into which the needle of the blowing apparatus has penetrated, which extends from the molded object, must be separated. This separating operation occurs between the operation of withdrawing the object from the mold and a finishing operation, which is usually done on an independent finishing machine of a known type.

Heretofore the operation of separating the appendage was done independently of the blowing and withdrawing operations. The present invention has as an object to realize, in one automatic continuous operation, the complete manufacture of hollow objects, including the separation of the appendage.

The invention consists essentially in associating with each mold of a molding machine an apparatus for cutting the neck of the hollow object, the operation of which is timed with the steps of the manufacturing cycle and is intercalated between the inflation of the object and its withdrawal from the mold.

The features and advantages of the present invention may best be understood by reference to the following description taken in conjunction with the accompanying drawings concerning an application of the invention to the machine described in French Patent 1,020,377 and U.S. Patent 2,579,390, comprising as an embodiment a series of molds placed on a rotating table.

Figure 1:
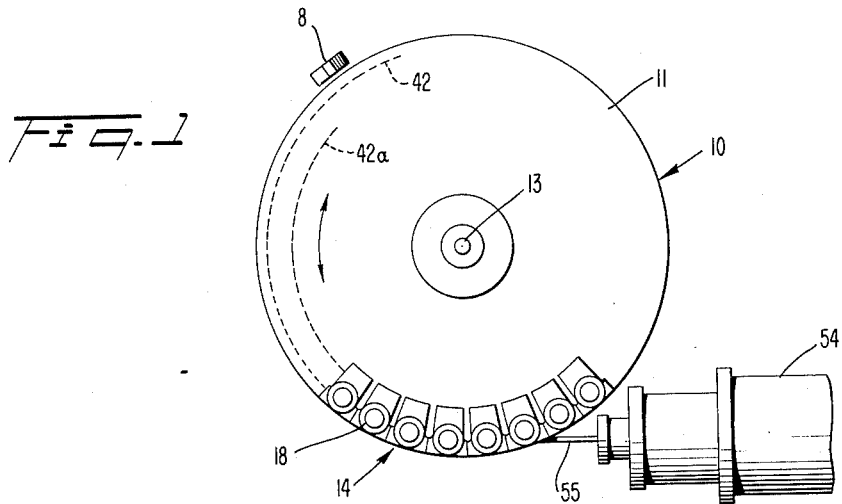
FIG. 1 is a fragmentary plan view of the machine.
Figure 2:
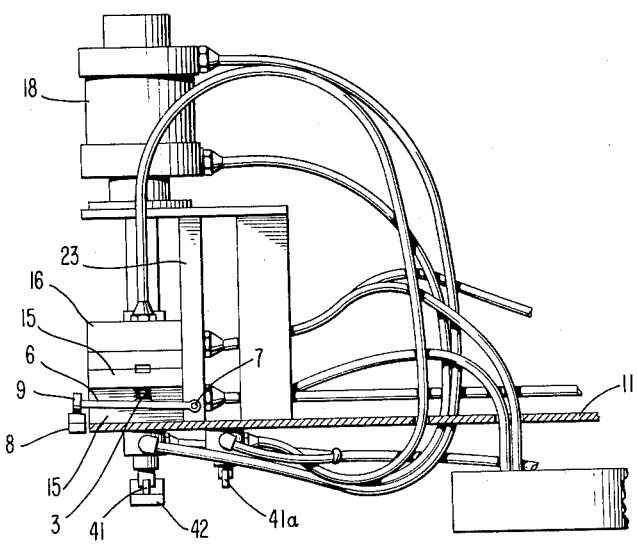
FIG. 2 is an elevational view showing a closed mold, the position of the cutter operating cam, and the control bar of the cutting apparatus in its relation to the molding table.

The machine comprises (FIG. 1) a circular table 11 supported at its center by a central pin 13 integral with a rotary pedestal as described in the identified patent. A number of molds 14, constituted by two half-molds 15 and 16 (FIG. 2), are mounted on the upper face of table 11. Half-mold 15 is fixed on the table, and half-mold 16 is movable and can be fitted to the first half-mold by vertical displacement. Plastic extrusion nozzle 54 and the tube of extruded plastic material 55 can be seen on FIG. 1. Cam 42 for closing the molds, cam 42a for controlling the blowing up, and cam 8 for controlling the cutting apparatus which is associated with the molds are also represented schematically. FIG. 2 shows the combined apparatus which accomplishes the closing of the molds, the blowing up of the plastic tube, and the cutting rollers 41 and 41a. Roller 41 is operated by cam 42 to close the molds in sequence; roller 41a is operated by cam 42a to control the introduction of the blowing up fluid. On this figure the control apparatus for the novel cutter includes abutment 8, control bar 6 which oscillates around a pin 7 mounted on guiding bar 23 of the movable half-mold 16, and a roller 9 which rides atop cam 8, as shown in FIG. 1, and is consequently in the position of having completed a cut. Thus the apparatus includes a cam, a cam follower, and a connection from the cam follower to the blade.

Figure 3:
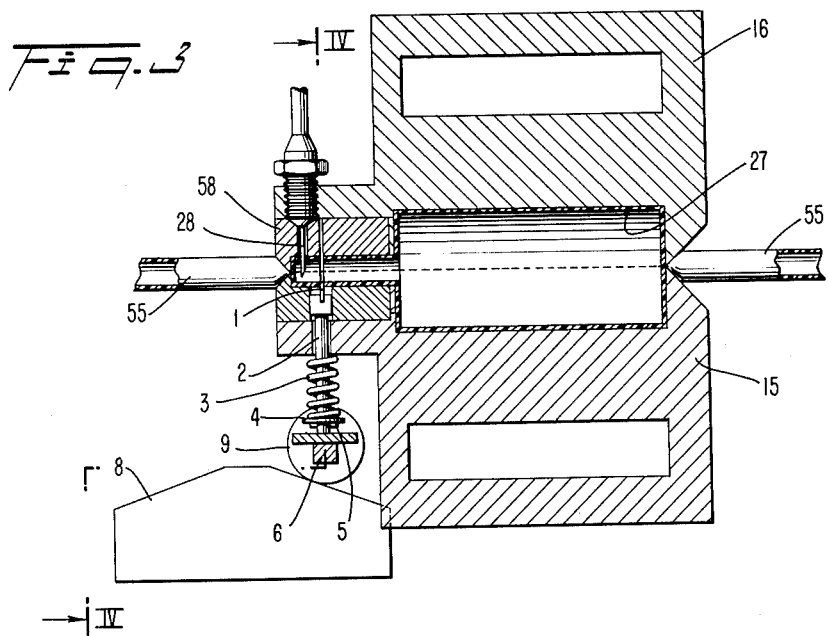
FIG. 3 is an enlarged sectional view on line III—III of FIG. 4 showing a closed mold and the position of the elements of the cutting apparatus and of the blowing apparatus.

FIG. 3 shows a closed mold containing a hollow object 27 after insufflation. On this figure the respective positions occupied by molded object 27, hollow blowing needle 28, and the cutting apparatus mounted on stem 2, is shown with the cutter cam follower 6 mounting the leading ramp of the cam.

Figure 4:
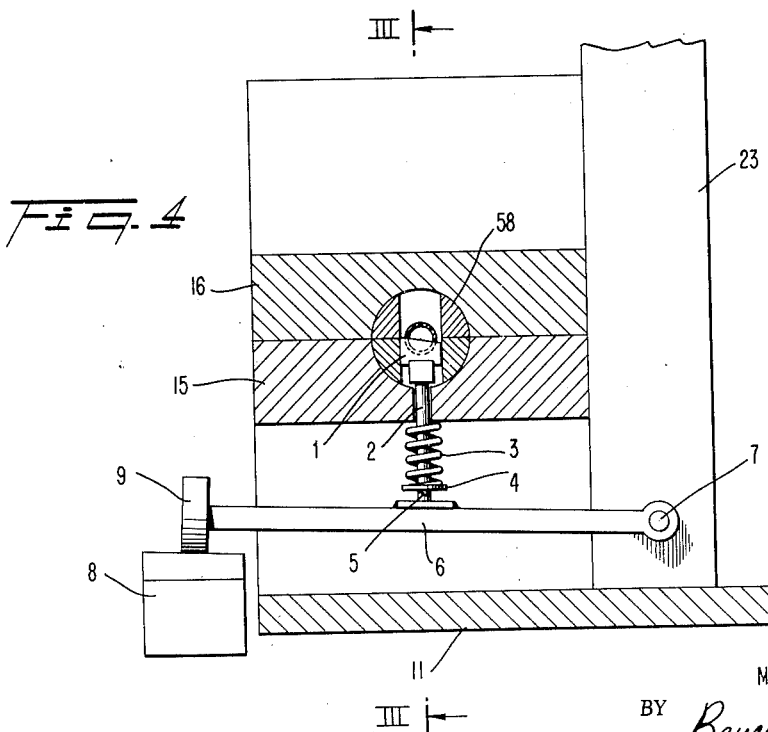
FIG. 4 is a perpendicular sectional view on line III—III of FIG. 3 showing in detail the cutting apparatus and its control appartus.

The cutting apparatus according to the invention is shown in detail in FIGS. 3 and 4; it comprises a blade 1 sliding in a slot provided in the thickness of the wall of lower half-mold 15 and an aligned slot in upper half-mold 16. This blade is fixed on movable stem 2 and is kept retracted, while the cutting apparatus is not operating in the thickness of the wall of the half-mold, by coil spring 3 mounted on stem 2 between the wall of the half-mold and a washer 4 which is fixed on stem 2 by a cotter pin 5. The lower end of stem 2 rests on command bar 6 of which one end is articulated on a pin 7 which is carried by guide bar 23. The outer end of bar 6 supports roller 9. The meeting faces of the parts of the molds which enclose the projection on the hollow object are machined to form a cylindrical surface which receives the split ring mold 58, which is provided with a guideway for the upper part of pin 2 (FIGS. 3, 4) and cooperating, aligned slots for cutter 1.

When roller 9 rolls over cam 8, it causes bar 6 to move upward, lift stem 2 and blade 1, compress spring 3, and cut the neck of the molded hollow object inside the closed mold. When roll 9 escapes from cam 8, the cutting apparatus returns to its resting position under the action of coil spring 3.

The respective positions of cams 42 and 42a and of abutment 8 are of course established in such a way that they ensure successively the automatic operations of the closing of the mold, of blowing through the hollow needle, and of cutting the neck of the molded object before the final opening of the mold.

It will be obvious to those skilled in the art that various changes and modifications may be made without departing from the inventive concept and it is therefore aimed in the appended claims to cover all such changes and modifications as fall within the true spirit and scope of the invention.

What is claimed is:

1. Apparatus for the manufacture of hollow articles that comprises a feeder adapted to feed a hollow, plastic tube to a series of molds, a series of molds mounted for rotation about a common center, each mold comprising upper and lower complementary parts, an injector in each mold in one of the parts thereof aligned with the tube, pressure means operatively associated with each injector, a cutter in one part of each mold and a corresponding cavity in the other part of each mold for receiving said cutter and each aligned with and transversely to the tube inward of and adjacent the injectors, means to rotate the molds, means to open and close each mold, and means to operate the cutter including actuating means stationed near the rotating molds, and cooperating actuating means operatively attached to each cutter and aligned with the said actuating means whereby to operate each cutter at each rotation of the mold.

2. In the apparatus for the automatic manufacture of hollow articles from plastic tubing a rotatable table, a split hollow mold mounted thereon having relatively movable parts adapted to grip a plastic tube and having aligned cavities in the parts forming a guide for a cutting blade, means to close and open the mold parts, a cutting blade reciprocably mounted in one of said cavities, spring means biasing the blade into said one cavity, and means to operate the blade comprising a relatively fixed cam, a cam follower mounted on the table in alignment with the cam, and means to connect the cam follower to the blade in opposition to the spring to move the blade in the guide toward the other of said cavities whereby to sever the tube as the cam follower engages the cam.

3. In apparatus for the automatic manufacture of hollow articles from plastic tubing a rotatable table, a split hollow mold mounted thereon having relatively movable parts adapted to grip a plastic tube and having aligned cavities in the parts forming a guide for a cutting blade, means to close and open the mold parts, a cutting blade reciprocably mounted in one of said cavities, spring means biasing the blade into said cavity, and means to operate the blade in opposition to the spring to move the blade in the guide to sever the tube.

4. In an apparatus for the automatic manufacture of hollow articles, a split hollow mold having principally two relatively movable parts, a cutting apparatus comprising a cutting blade sliding in a housing provided in the thickness of the wall of one part of the mold, a cavity in the other part of the mold aligned with said blade for receiving the same, a stem supporting the blade, a coil spring mounted on the stem, a command bar supporting the stem and articulated at one end and provided at the other end with a roller, and abutment means to guide the roller at the proper time.

5. Apparatus for the manufacture of hollow articles that comprises a feeder to feed a hollow tube in plastic condition to a mold, a split hollow mold having relatively movable parts to receive the tube between them and having jaws adapted to grip a section of the tube, an injector carried by the mold that penetrates the tube and inflates it against the mold wall, a reciprocable element connected to a mold part to open and close the mold, a cutting blade mounted within the mold transversely to the tube in the vicinity of the injector and sliding in a housing provided in the thickness of the wall in one part of the mold, a cavity in the other part of the mold aligned with said blade for receiving the same, a stem supporting the blade, a coil spring mounted on the stem, a command bar supporting the stem and articulated at one end and provided at the other end with a roller, and abutment means to guide the roller at the proper time.

References Cited in the file of this patent

UNITED STATES PATENTS

| | | |
|---|---|---|
| 2,541,249 | Hobson | Feb. 13, 1951 |
| 2,579,390 | Mills | Dec. 18, 1951 |
| 2,810,160 | Bottleman | Oct. 22, 1957 |
| 2,943,349 | Adams et al. | July 5, 1960 |
| 2,988,776 | Schaich | June 20, 1961 |
| 2,991,500 | Hagen | July 11, 1961 |
| 3,003,187 | Schaich | Oct. 10, 1961 |
| 3,019,481 | Negoro | Feb. 6, 1962 |
| 3,025,562 | Nelson | Mar. 20, 1962 |